United States Patent [19]

Gratza et al.

[11] 4,241,933

[45] Dec. 30, 1980

[54] SIDE SUPPORT FOR MOTORCYCLE

[75] Inventors: Peter Gratza; Heinz Estel, both of Munich, Fed. Rep. of Germany

[73] Assignee: Bayerische Motoren Werke Aktiengesellschaft, Fed. Rep. of Germany

[21] Appl. No.: 904,884

[22] Filed: May 11, 1978

[30] Foreign Application Priority Data

May 11, 1977 [DE] Fed. Rep. of Germany ....... 2721180

[51] Int. Cl.³ .............................................. B62H 1/02
[52] U.S. Cl. .................... 280/301; 180/219; 180/271; 280/764
[58] Field of Search .................. 280/301, 764; 180/30, 180/219, 271

[56] References Cited

U.S. PATENT DOCUMENTS

| Re. 16321 | 4/1926 | Henderson | 280/301 |
| 2,300,762 | 11/1942 | Andrews | 180/30 |
| 2,908,510 | 10/1959 | Lossau | 180/30 X |
| 3,039,792 | 6/1962 | Wood | 280/302 |
| 4,073,505 | 2/1978 | Yamazaki | 280/301 |
| 4,095,823 | 6/1978 | Nishida | 280/301 X |

FOREIGN PATENT DOCUMENTS 28123 4/1964 German Democratic Rep.

Primary Examiner—John P. Silverstrim
Attorney, Agent, or Firm—Craig & Antonelli

[57] ABSTRACT

A kick stand for a motorcycle which is pivotally connected at the frame and is pivotal into a swung-out parking position against the action of a spring retaining the kick stand in the swung-in driving position; the kick stand is thereby forcibly pivoted into the driving position at the beginning of the drive by an actuating mechanism.

8 Claims, 7 Drawing Figures

SIDE SUPPORT FOR MOTORCYCLE

The present invention relates to a side support for a motorcycle, commonly referred to as kick stand, which is pivotally connected at the motorcycle frame and is adapted to be pivoted into the swung-out parking position against the action of a spring holding the same in the swung-in position.

A side support or kick stand of this type is disclosed in the German Gebrauchsmuster 7,328,256 whereby an electrically actuated installation is provided which effects that the starter of the motorcycle can be turned on only when the side support or kick stand is in the driving position. This, however, entails the disadvantage that the engine cannot be started with a standing or parked motorcycle.

It is the aim of the present invention to provide a mechanically actuated mechanism which prevents a setting into motion of the motorcycle with the side support or kick stand in the parking position.

The underlying problems are solved according to the present invention in that an installation is provided which, during the beginning of the drive, forcibly releases the side support or kick stand for pivoting the same into the driving position.

In realization of the present invention, provision is made that the installation is actuated by way of the clutch mechanism, the shifting mechanism or during a load on the seat or seat bench of the motorcycle.

Since the installation provided for the pivoting of the side support or kick stand cooperates with the clutch mechanism, with the shifting mechanism or with the seat bench, it is assured in every case that the side support or kick stand pivots or swings in when the motorcycle is about to be set into motion, and a situation dangerous to or impairing the drive is precluded thereby. Nonetheless, the engine can be started with a standing motorcycle, i.e., while supported on its kick stand.

Accordingly, it is an object of the present invention to provide a side support for a motorcycle in the form of a kick stand which avoids by simple means the aforementioned shortcomings and drawbacks encountered in the prior art.

Another object of the present invention resides in an installation for a side support of a motorcycle which automatically swings the same into the normal driving position when the motorcycle is about to be set into motion.

A further object of the present invention resides in a motorcycle equipped with a kick stand as lateral support thereof, which permits starting of the motorcycle engine while the motorcycle is still supported on the kick stand, yet effectively precludes any dangerous driving conditions due to a non-retracted kick stand.

A still further object of the present invention resides in an installation for automatically swinging up the lateral support of a motorcycle in the form of a kick stand, when the motorcycle is about to be set into motion, which utilizes extremely simple and operationally reliable means.

These and other objects, features and advantages of the present invention will become more apparent from the following description when taken in connection with the accompanying drawing which shows, for purposes of illustration only, several embodiments in accordance with the present invention, and wherein.

Figure 6:
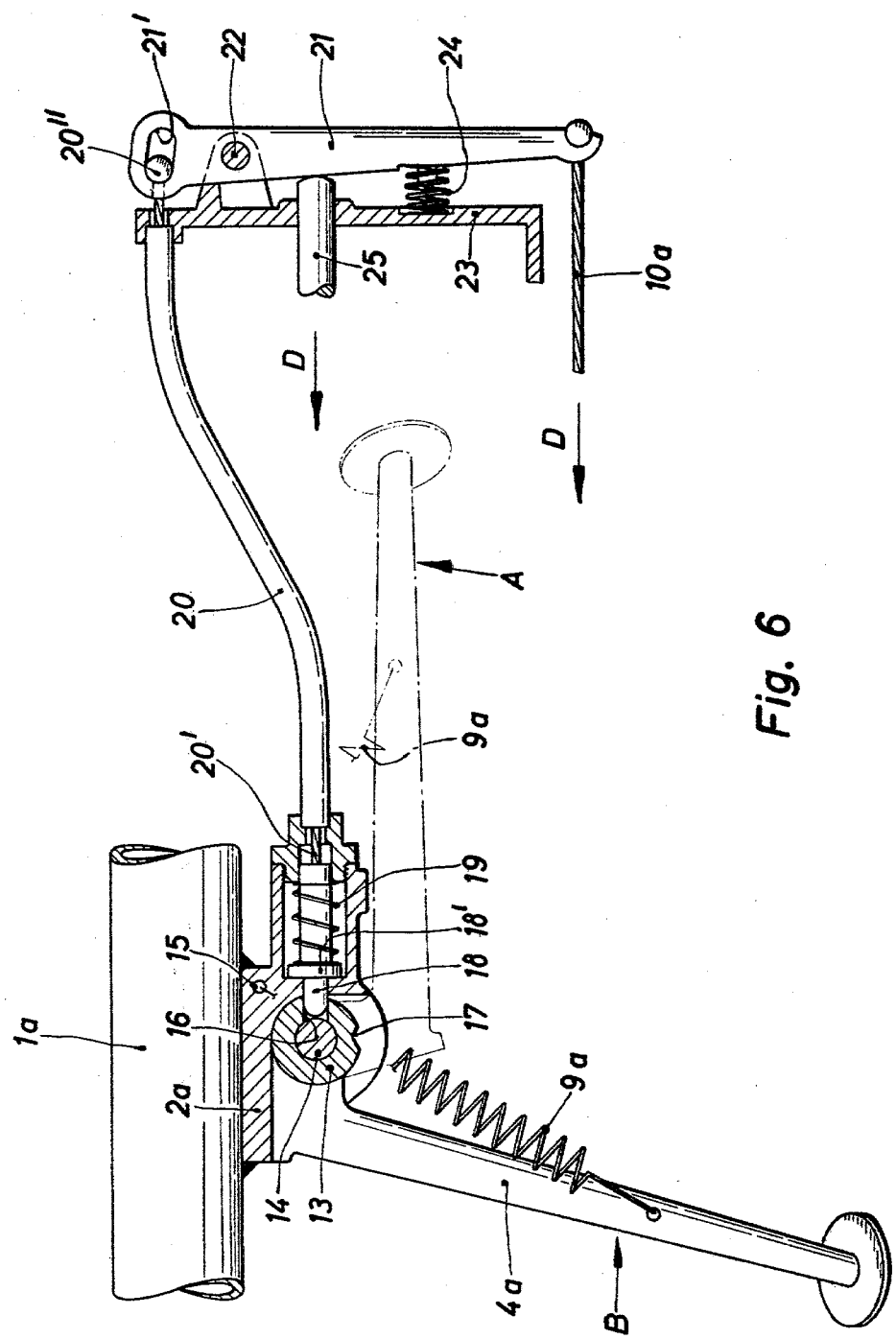
Figure 7:
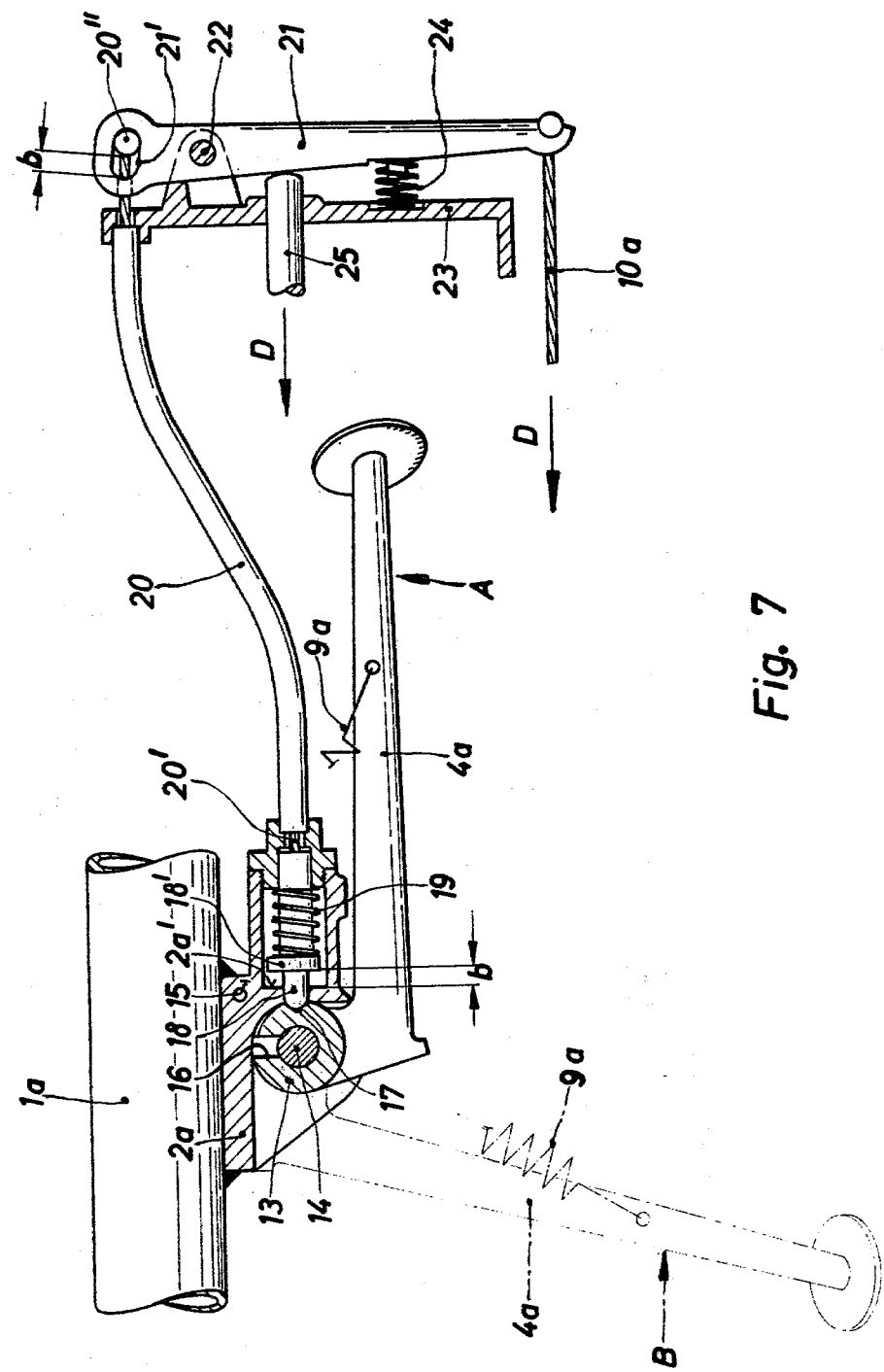

FIG. 6 is a somewhat schematic side elevational view, partly in cross section, of a still further modified embodiment of a side support in accordance with the present invention which is halted in the parking position by means of a spring-actuatable mechanism whose spring acts below dead-center position; and FIG. 7 is a somewhat schematic side elevational view, partly in cross section, of the side support of FIG. 6, illustrating the parts thereof in the driving position.

Figure 1:
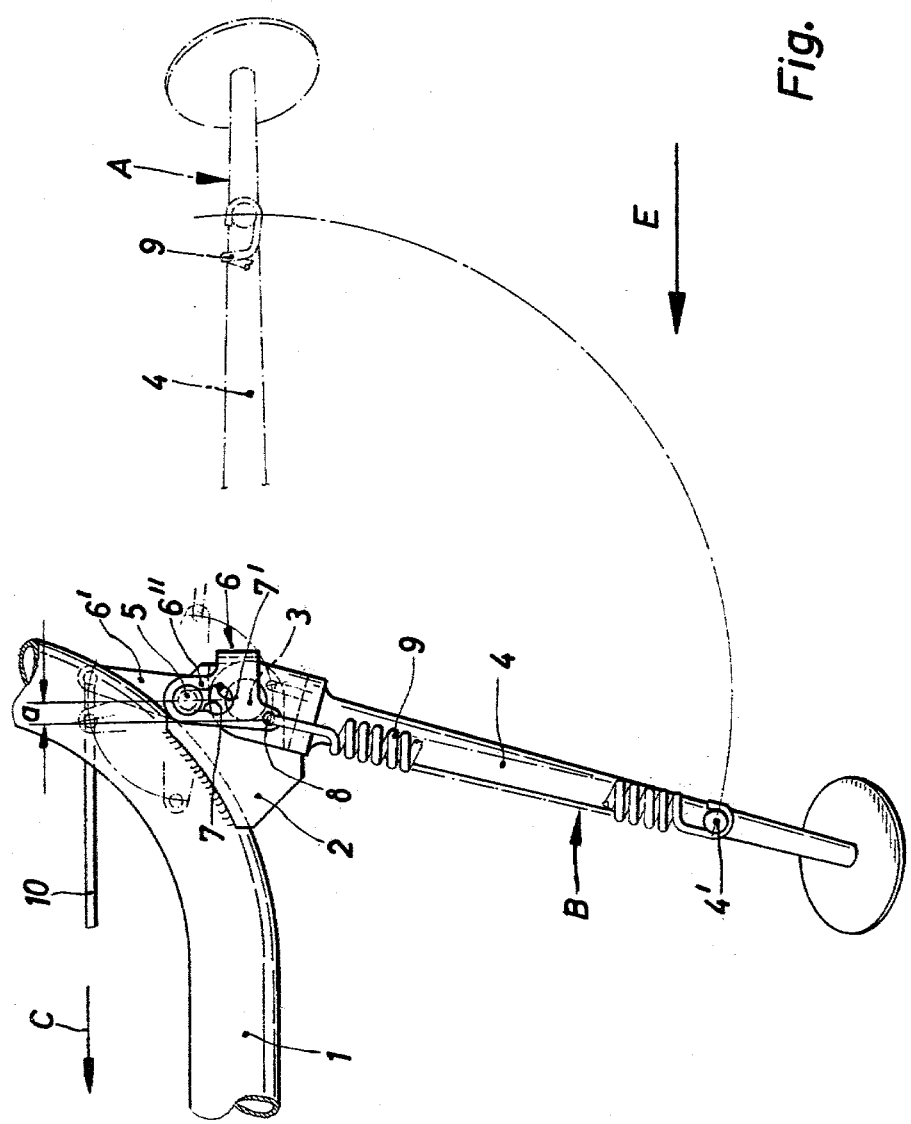
FIG. 1 is a partial side elevational view of a side support according to the present invention in the parking position whose springs act beyond the dead-center position.
Figure 2:
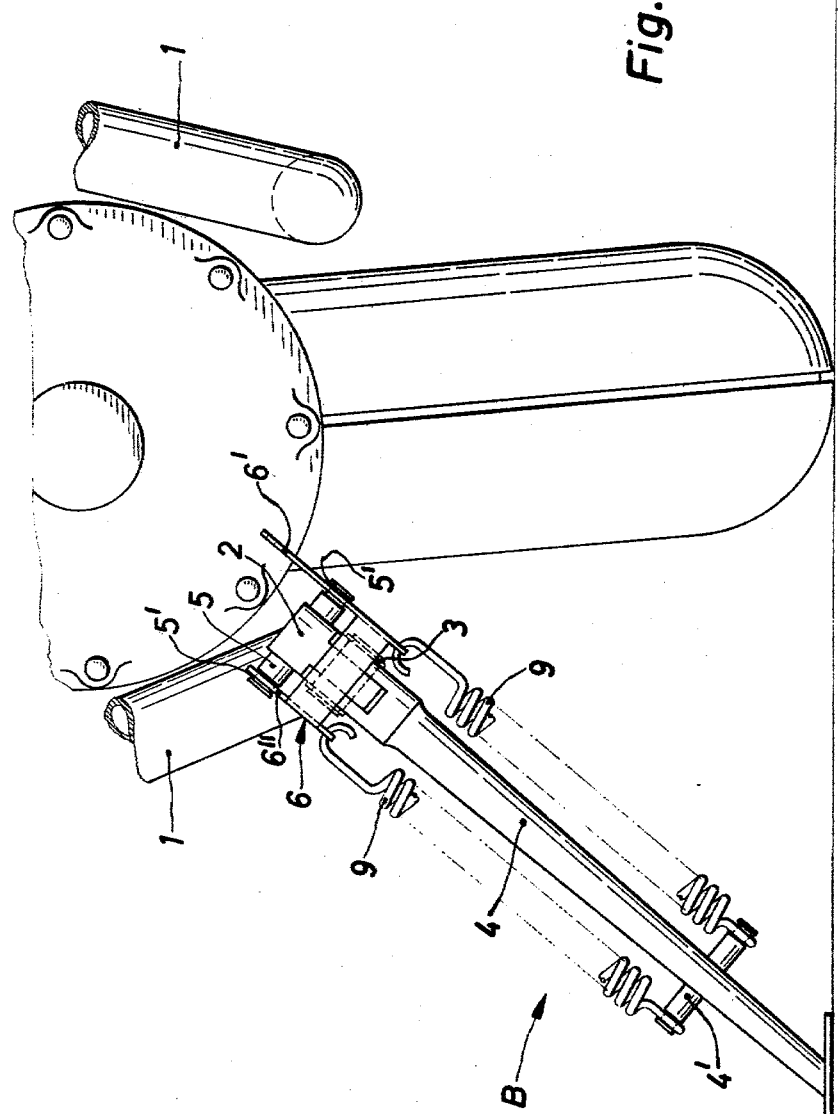
FIG. 2 is a partial end elevational view of the side support of FIG. 1, taken in the direction of the arrow E.

Referring now to the drawing wherein like reference numerals are used throughout the various views to designate like parts, and more particularly to FIGS. 1 and 2, a mounting member 2 is welded to a frame 1 of a motorcycle, partially illustrated in FIGS. 1 and 2. A side support or kick stand 4 is pivotally connected at the mounting member 2 by way of a joint bolt 3. A bearing bolt 5 is inserted into the mounting member 2 above the joint bolt 3. One leg 6' and 6" each of a U-shaped pivot lever generally designated by reference numeral 6 is pivotally supported on the two end areas of the bearing bolt 5 by way of an elongated aperture 7. One fastening place each constructed as eyelet or lug 8 for a drawspring 9 is provided at the legs 6' and 6" within the area of the lower edge of the pivot lever 6 and offset by a distance a (FIG. 1) with respect to the longitudinal center of the aperture 7 toward the front edge of the pivot lever 6; the drawsprings 9 are suspended with their oppositely disposed ends under prestress on a cross pin 4' inserted into the shaft or shank of the side support 4. The aperture 7 is provided with an approximately semicircularly shaped enlargement 7' (FIG. 1) whose diameter is slightly larger than the outer diameter of the bearing bolt 5. For purposes of assembly of the pivot lever 6, the enlargements 7' are slipped over the two ends of the bearing bolt 5 and are longitudinally displaced in the grooves 5' thereof (FIG. 2) up to the end abutment.

The side support or kick stand 4 is pivoted by muscle force actuation from the driving position A indicated in dash and dotted lines into the parking position B shown in full lines (FIG. 1). By reason of the fact that the fastening places of the drawsprings 9 at the pivot lever 6 are provided at the distance a to the longitudinal center of the aperture 7, it is achieved that during the swinging out of the side support 4, the latter is held in the parking position B by spring force after passing through the deadcenter position (vertical position of the side support 4), whereby the area of pivotal connection of the side support or kick stand 4 cooperates abutment-like with the mounting member 2. The swinging-in, i.e., the pivoting up of the side support 4 into the driving position A takes place by way of a draw or pulling device 10 engaging at the leg 6' of the pivot lever 6 and moving in the direction of arrow C (FIG. 1) in such a manner that the eyelets 8, which receive the drawsprings 9, are pivoted back up to approximately beyond the dead-center position of the side support 4, which thereupon is pivoted into the driving position A by the spring force of the drawsprings 9 which now becomes effective. The draw device 10 is operatively connected by any conventional means with the clutch mechanism, with the shifting mechanism or with the seat bench in such a manner that during the actuation or loading thereof, the draw device 10 is longitudinally displaced in the direction of arrow C so that a setting into motion of the motorcycle is possible only with a side support or kick stand 4 disposed in the driving position A. The mounting member 2 thereby serves as end abutment for the side support or kick stand 4. Since the bearing bolt 5 of the pivot lever 6 is arranged above the place of pivotal connection of the side support 4, the latter is retained in its swung-in or pivoted-up end position (driving position A) by the drawsprings 9. By reason of the fact that two parallelly acting drawsprings 9 engage at the side support 4, the pivotability of the side support or kick stand 4 is assured also in case of breakage of one of the drawsprings 9.

Figure 3:
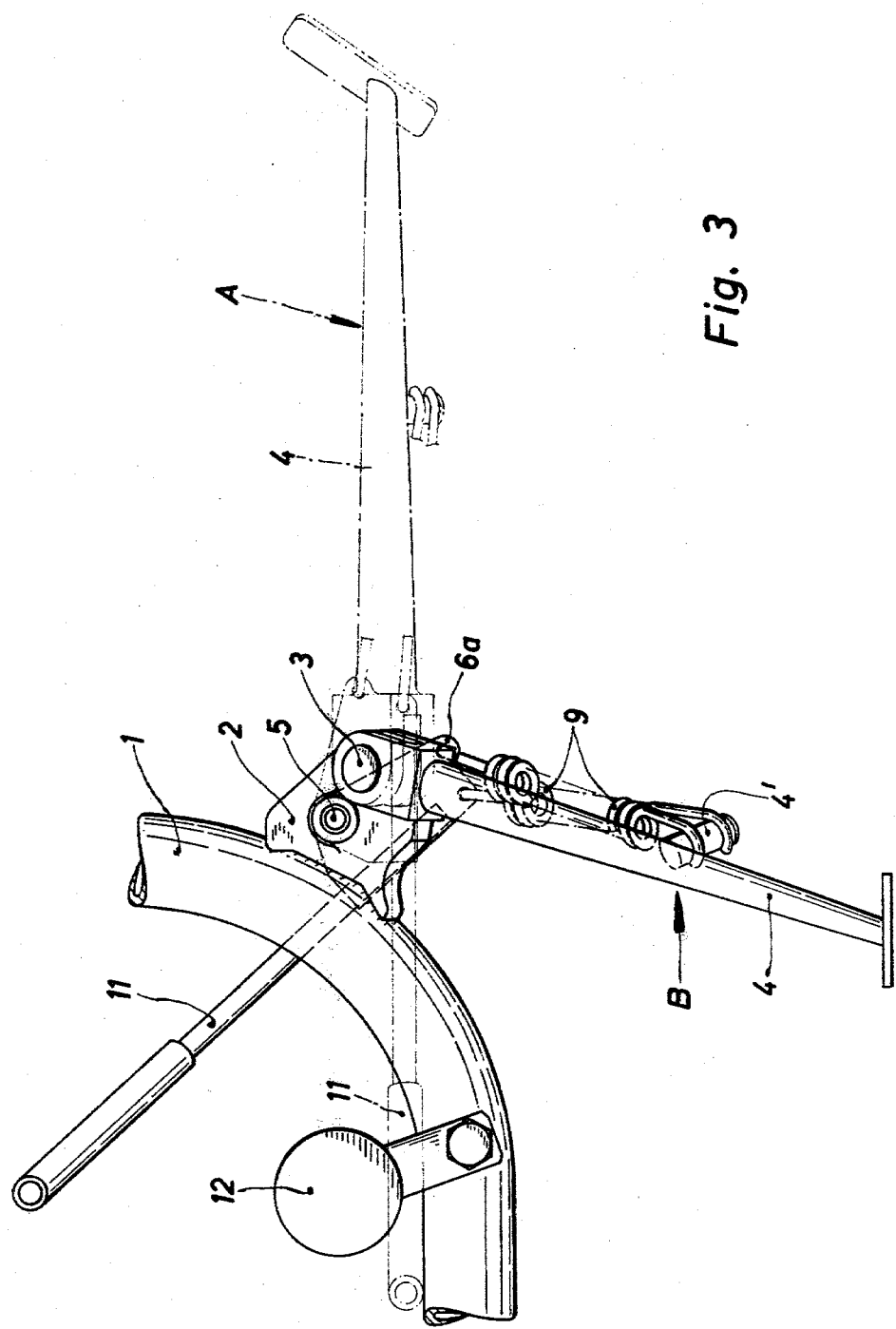
FIG. 3 is a side elevational view of a modified embodiment of a side support of a motorcycle in accordance with the present invention, illustrating the same in the parking position.
Figure 4:
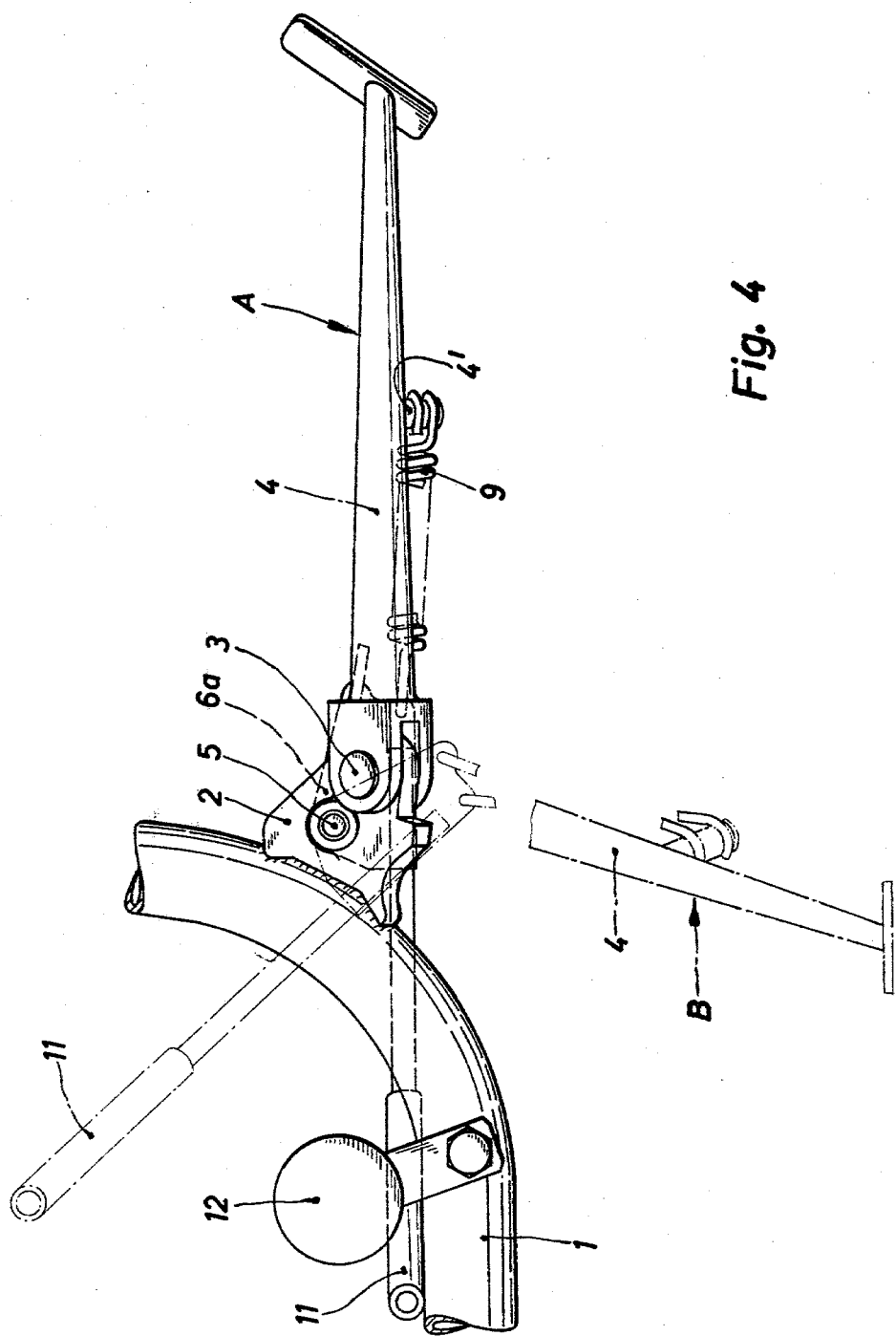
FIG. 4 is a side elevational view, similar to FIG. 3, illustrating the side support in the driving position.
Figure 5:
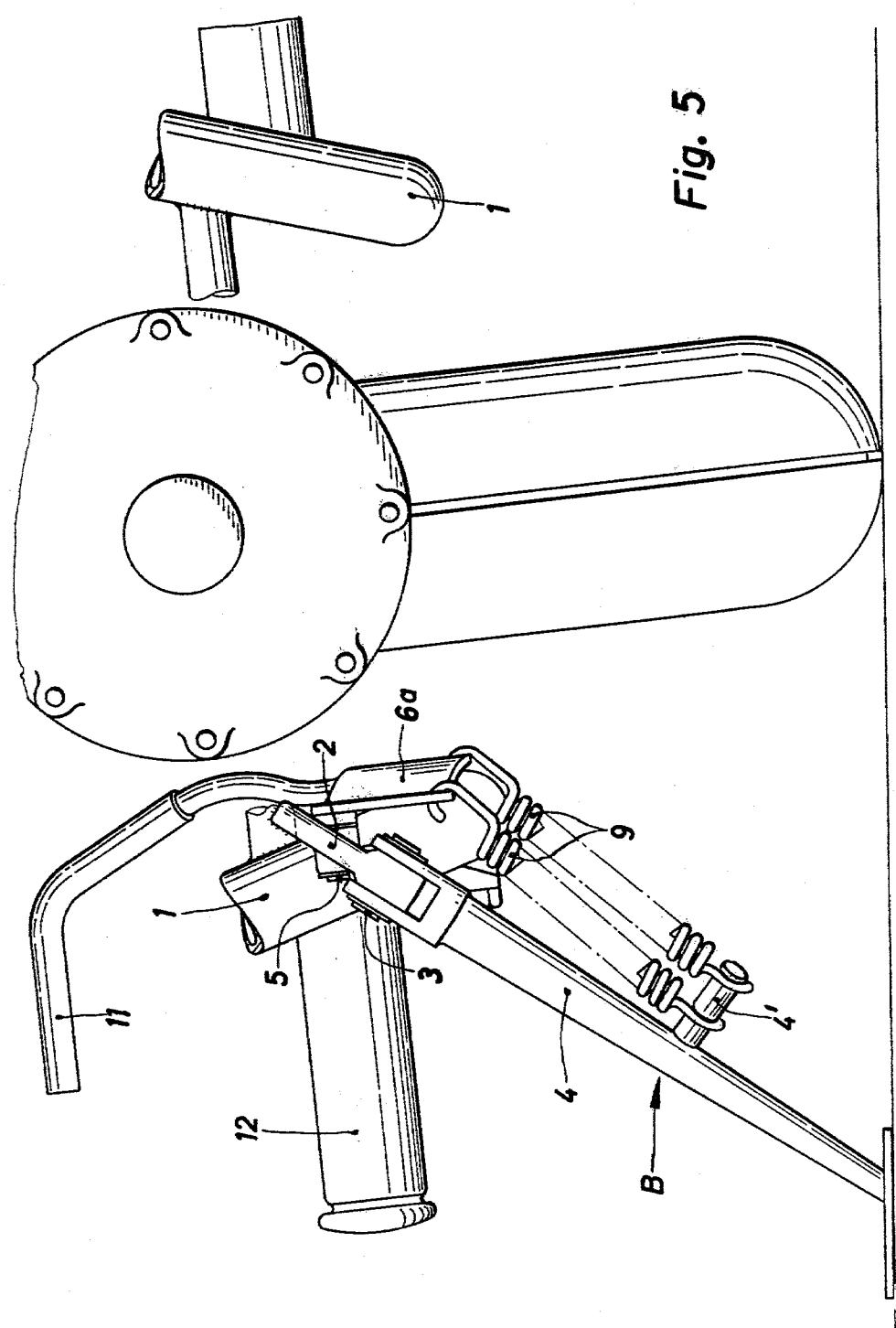
FIG. 5 is a rear elevational view of the side support illustrated in FIGS. 3 and 4.

The side support or kick stand 4 illustrated in FIGS. 3 to 5 is essentially identical in function with the kick stand 4 illustrated in FIGS. 1 and 2, whence similar parts are designated with the same respective reference numerals. The pivot lever 6a is operatively connected with an actuating lever 11 which extends up to within the area of a foot rest 12 and, with the side support 4 in the parking position B, its free end lies above the foot rest 12 whereas it is approximately in one and the same plane with the side support 4 when the latter is in the driving position A. When the motorcycle operator supports his foot on the foot rest 12 for setting the motorcycle into operation, the actuating lever 11 is forcibly swung down and as a result thereof the side support or kick stand 4 is pivoted in the aforementioned manner from the parking position B (FIG. 3) into the driving position A (FIG. 4). It is also feasible within the scope of the present invention that an actuating lever is pivotally connected at the frame 1 above the foot rest 12 and is connected with the pivot lever 6a by way of a flexible draw mechanism.

The side support or kick stand 4a illustrated in FIGS. 6 and 7 is provided at its point of pivotal connection on the side of the frame with a joint boss 13. The latter is supported by way of a joint bolt 14 in a mounting member 2a secured at the frame 1a and is provided along its outer circumference with radially directed recesses 16 and 17 arranged angularly offset. The mounting member 2a is provided with a longitudinally displaceable locking bolt 18 which is displaceable against the action of a compression spring 19. The draw cable part 20' of a Bowden cable 20 is secured to the back side of the locking bolt 18. The opposite end of the draw cable part 20' is provided with a Bowden cable nipple 20" which is arranged longitudinally displaceable in an elongated aperture 21' of a rocker arm 21. The rocker arm 21 is pivotally connected at a support part 23 fixed relative to the frame by way of a pin 22 and is displaceable against the action of a spring 24. Furthermore, a bolt 25 displaceable in the pivot direction of the rocker arm 21, abuts at the rocker arm 21; the bolt 25 is thereby operatively connected by conventional means with the clutch mechanism of the motorcycle whereas the draw device 10a engages at the free end of the rocker arm which cooperates with the clutch mechanism, the shifting mechanism or the seat bench. However, it is also feasible within the scope of the present invention to arrange an actuating lever operatively connected with the draw device 10a within the area of the foot rest of the motorcycle in a similar manner as illustrated in FIGS. 3 to 5. A drawspring 9a arranged ahead of dead-center position engages at the side support or kick stand 4' and is secured with its opposite end at the mounting member 2a at 15.

The side support or kick stand 4a is swung like the kick stand 4 by muscle force actuation from the driving position A into the parking position B whereby the locking bolt 18 is displaced slightly against the action of the compression spring 19. In the parking position B, the forward end of the locking bolt 18 is pushed into the recess 16 by the action of the compression spring 19 so that the side support 4a is stopped in this position and is therewith secured against any unintentional swinging up. The rocker arm 21 thereby remains in the normal, rest position because—as shown in FIG. 7—in the driving position A of the side support or kick stand 4a, the collar 18' of the locking bolt 18 is disposed at a distance b from an abutment surface 2a' of the mounting member 2a and the Bowden cable nipple 20" secured at the opposite end of the draw cable part 20' is arranged spaced at the same distance b from the forward semi-circularly shaped wall of the elongated aperture 21'. The side support 4a is displaced into the driving position A in that during actuation of the clutch for setting the motorcycle into motion, the bolt 25 cooperating with the clutch is longitudinally displaced in the direction of arrow D. Thereupon, the rocker arm 21 can be pivoted by the draw device 10a effective in the direction of arrow D and thus the locking bolt 18 can be pulled out of the recess 16 by way of the draw cable 20' whereby the Bowden cable nipple 20" abuts at the forward end of the elongated aperture 21'. After the automatic swinging up of the side support or kick stand 4a which is now possible, the locking bolt 18 with an unloaded rocker arm 21 engages in the recess 17 whereby the side support 4a is also blocked in the driving position A.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A parking support device for a two, tandem wheeled vehicle having a frame, said device comprising: a mounting means fixed to said frame; a side support mounted on said mounting means for pivotal movement about a first axis, between a ground engaging parking position and a retracted, driving position; a pivot lever means mounted on said mounting means for pivotal movement about a second axis positioned above said first axis; means for pivoting said lever means about said second axis from a first to a second position; spring means having two ends; means for connecting one of said two ends to said side support; and means for connecting the other of said two ends to said lever means at a point below said first axis whereby when said lever means is in said first position said point is beyond a dead-center position causing said spring to bias said side support to said parking position, and when said pivoting means moves said lever means to said second position said point moves into a position ahead of dead-center causing said spring to move said side support into said driving position.

2. A parking support device according to claim 1, wherein said pivot lever means is of essentially U-shape and is mounted for pivotal movement about said second axis with its two leg portions at a bearing bolt inserted into the mounting means.

3. A parking support device according to claim 2, wherein said spring means comprises two springs, each spring having two ends, one end of each spring being connected at the shank of the side support and the other end of each spring being connected to a respective leg portion of said pivot lever means.

4. A parking support device according to claim 1, wherein said means for connecting the other of said two ends to said lever means includes an eyelet formed in said lever means.

5. A parking support device according to claim 1, wherein said means for pivoting said lever means about said second axis is operatively connected with clutch means of said vehicle.

6. A parking support device according to claim 1, wherein said means for pivoting said lever means about said second axis is operatively connected with shifting means of said vehicle.

7. A parking support device according to claim 1, wherein said means for pivoting said lever means about said second axis comprises an actuating lever which extends up to within the area of a foot rest of the vehicle when the side support is in the parking position.

8. A side support according to claim 1, wherein the side support is a kick stand.

* * * * *